United States Patent
Oba et al.

(10) Patent No.: US 8,707,416 B2
(45) Date of Patent: Apr. 22, 2014

(54) BOOTSTRAPPING KERBEROS FROM EAP (BKE)

(75) Inventors: Yoshihiro Oba, Englewood Cliffs, NJ (US); Subir Das, Kendall Park, NJ (US)

(73) Assignees: Toshiba America Research, Inc., Washington, DC (US); Telcordia Technologies, Inc, Piscataway, NJ (US)

(*) Notice: Subject to any disclaimer, the term of this patent is extended or adjusted under 35 U.S.C. 154(b) by 1558 days.

(21) Appl. No.: 11/944,605

(22) Filed: Nov. 24, 2007

(65) Prior Publication Data

US 2008/0178277 A1    Jul. 24, 2008

Related U.S. Application Data

(60) Provisional application No. 60/885,801, filed on Jan. 19, 2007.

(51) Int. Cl.
*H04L 29/06* (2006.01)

(52) U.S. Cl.
USPC .......... 726/10; 726/1; 726/3; 726/5; 713/156; 713/157; 713/158; 713/175

(58) Field of Classification Search
USPC ....................................................... 726/10
See application file for complete search history.

(56) References Cited

U.S. PATENT DOCUMENTS

2005/0210252 A1* 9/2005 Freeman et al. ............. 713/171

OTHER PUBLICATIONS

Tschofenig H. et al.; "Boostrapping Kerberos draft-tschofenig-pana-boostrap-kerberos-00", Internet-Draft; PANA Working Group; Jul. 12, 2004.*
Mohamedali Kaafar et al. "A Kerberos-Based Authentication Architecture for Wireless LANs" Mobile and Wireless Communications Lecture Notes in Computer Science, Jan. 1, 2004 pp. 1344-1353, vol. 3042, Greece.*
Mohamedali Kaafar et al. "A Kerberos-Based Authentication Architecture for Wireless LANs", Mobile and Wireless Communications Lecture Notes in Computer Science, Jan. 1, 2004, pp. 1344-1353, vol. 3042, Greece.
Ohba Toshiba S Das Telcordia Y: "An EAP Method for EAP Extension (EAP-EXT); draft-ohba-hokey-emu-eap-e xt-00.txt" IETF Standard-Working-Draft, Internet Engineering Task Force, IETF, CH, Jan. 4, 2007, XP015050280 ISSN: 0000-0004.
IEEE 802.11-00/419: "TGe Security Baseline" [Online] Nov. 2000, XP002482563 Retrieved from the Internet: URL:https://mentor.ieee.org/802.11/file/00/11-00-0419-00-000e-tge-security-baseline.ppt> [retrieved Jun. 2, 2008].
Bernard Aboba Dan Simon Microsoft: "EAP GSS Authentication Protocol: draft-aboba-pppext-eapgss-12.txt" IETF Standard-Working-Draft, Internet Engineering Task Force, IETF, CH, No. 12, Apr. 6, 2002, XP015000004 ISSN: 0000-0004.

(Continued)

*Primary Examiner* — Aravind Moorthy
*Assistant Examiner* — Jason Plotkin
(74) *Attorney, Agent, or Firm* — Westerman, Hattori, Daniels & Adrian, LLP

(57) ABSTRACT

The preferred embodiments involve a mechanism to bootstrap Kerberos from EAP in which EAP is used for initial network access authentication and Kerberos is used for provisioning session keys to multiple different protocols. The preferred embodiments make use of an EAP extension method (EAP-EXT) to realize the mechanism.

18 Claims, 10 Drawing Sheets

(56) References Cited

OTHER PUBLICATIONS

Johnathon Trostle Cisco Systems Michael Swift University of WA Bernard Aboba Microsoft Glen Zorn Cisco Systems: "Initial and Pass Through Authentication Using Kerberos V5 and the GSS-API (IAKERB): draft-ietf-cat-iakerb-08.txt" IETF Standard-Working-Draft, Internet Engineering Task Force, IETF, CH, vol. cat, No. 8, Sep. 1, 2001, XP015016374 ISSN:0000-0004.

Canadian Office Action dated Jul. 6, 2012, issued in corresponding Canadian Patent Application No. 2,675,962 (3 pages).

Aboba, Bernard et al.; "EAP GSS Authentication Protocol"; PPPEXT Working Group Internet-Draft Category: Experimental<draft-aboba-pppext-eapgss-12.txt> Apr. 6, 2002, pp. 1-40.

European Office Action dated Dec. 12, 2011, issued in corresponding European Patent Application No. 08703857.6, 5 pages.

Trostle, Jonathan et al.; "Initial and Pass Through Authentication Using Kerberos V5 and the GSS-API (IAKERB))", Internet-Draft ; draft-ietf-cat-iakerb-08.txt; Updates: RFC 1510, 1964; Sep. 2001, pp. 1-26.

Halasz, David et al.; "TGe Security Baseline"; IEEE 802.11-00/419; Nov. 2000, XP002482563, Retrieved from the Internet: URL:https://mentor.ieee.org/802.11/file/00/11-00-0419-00-000e-tge-security-baseline.ppt [retrieved on Jun. 2, 2008], pp. 1-38.

Japanese Office Action dated Nov. 22, 2011, issued in corresponding Japanese Patent Application No. 2009-526352.

Mohamedali Kaafar et al., "A Kerberos-Based Authentication Architecture for Wireless LANs", Mobile and Wireless Communications Lecture Notes in Computer Science, Jan. 1, 2004, pp. 1344-1353, vol. 3042, Greece. (Japanese Office Action dated Nov. 22, 2011).

Ohba Toshiba S Das Telcordia Y: "An EAP Method for EAP Extension (EAP-EXT); draft-ohba-hokey-emu-eap-e xt-00.txt" IETF Standard-Working-Draft. Internet Engineering Task Force, IETF, CH, Jan. 4, 2007, XP015050280 ISSN: 0000-0004.(Japanese Office Action dated Nov. 22, 2011).

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     CODE      |   IDENTIFIER  |            LENGTH             |
+-+-+-+-+-+-+-+-+-+-+-+-+-+-+-+-+-+-+-+-+-+-+-+-+-+-+-+-+-+-+-+-+
|     TYPE      |    VERSION    |F|E| RESERVED  |  CAPABILITIES |
+-+-+-+-+-+-+-+-+-+-+-+-+-+-+-+-+-+-+-+-+-+-+-+-+-+-+-+-+-+-+-+-+
|                     TLV(S) (OPTIONAL) ...
+-+-+-+-+-+-+-+-+-
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             TYPE              |            LENGTH             |
+-+-+-+-+-+-+-+-+-+-+-+-+-+-+-+-+-+-+-+-+-+-+-+-+-+-+-+-+-+-+-+-+
|                     VALUE ...
+-+-+-+-+-+-+-+-+-
```

FIG. 3C

BOOTSTRAPPING KERBEROS FROM EAP (BKE)

The present application claims priority under 35 U.S.C. 119 to provisional application Ser. No. 60/885,801, entitled Bootstrapping Kerberos from EAP (BKE), filed on Jan. 19, 2007, the entire disclosure of which is incorporated herein by reference, including all Appendices.

BACKGROUND

General Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e. Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identfier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers, (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Background Regarding Kerberos:

Kerberos is a network authentication protocol. See: web-.mit.edu/Kerberos/. It provides authentication for client/server applications by using secret-key cryptography. A free implementation of this protocol is available from the Massachusetts Institute of Technology. Kerberos is available in many commercial products as well.

Kerberos is a secure method for authenticating a request for a service in a computer network. Kerberos lets a user request an encrypted ticket from an authentication process that can then be used to request a particular service from a server. The user's password does not have to pass through the network.

Kerberos [RFC1510] is a well-known security protocol which provides authentication, authorization and key distribution. It is used to secure a number of protocols.

Kerberos allows the client A to obtain an initial ticket to access a Ticket Granting Service (TGS) without requiring the user to re-entry the password. That initial ticket allows the client A to start a Kerberos negotiation with TGS to obtain another ticket for accessing the service B. By using this approach, Kerberos also allows a cross-realm operation where A can recover a ticket from a remote TGS (in A's Home Domain) to access a local TGS (in the visited domain). However, Kerberos requires time synchronization among the three parties.

In some examples, by combining the flexibility of the EAP framework with the wide deployment of Kerberos in universities and corporate networks it is possible to bootstrap a Kerberos Ticket Granting Ticket. This Kerberos Ticket Granting Ticket can then be used to retrieve service tickets for usage with a variety of protocols. This approach of bootstrapping Kerberos ticket with the help of an EAP protocol interaction is described in [I-D.tschofenig-pana-bootstrap-kerberos], the entire disclosure of which is incorporated herein by reference.

Another approach to combine EAP and Kerberos is to integrate an EAP-based pre-authentication mechanism into Kerberos. However, using a generic protocol for bootstrapping credentials can also be used for bootstrapping symmetric keys for usage Mobile IP (as discussed as part of the MIPv6 bootstrapping work [I-D.ietf-mip6-bootstrap-ps]) or also to bootstrap public/private keys. Therefore, it would be necessary to confidentiality protect the delivery of an ephemeral public and private key pair to the end host. This key pair would have a short lifetime, possibly without the need for revocation mechanisms, and could be used in all security protocols utilizing public key based mechanisms (including IKEv2 or TLS). A big advantage is the avoided public key infrastructure since authentication protocols based on symmetric cryptography can still be used within EAP. As discussed in the below section, the Extensible Authentication Protocol (EAP) [see RFC3748 incorporated herein by reference in its entirety] provides authentication methods. In some examples, a PANA protocol [I-D.ietf-pana-pana] carries EAP messages between a PaC (PANA Client) and a PAA (PANA Authentication Agent) in the access network.

Background Regarding EAP:

Referring to reference to Aboba, RFC 3748 (cited below), illustrative aspects of Extensible Authentication Protocol (EAP) is set forth. EAP is an authentication framework which supports multiple authentication methods. EAP typically runs directly over data link layers such as Point-to-Point Protocol (PPP) or IEEE 802, without requiring IP. EAP provides its own support for duplicate elimination and retransmission, but is reliant on lower layer ordering guarantees. Fragmentation is not supported within EAP itself; however, individual EAP methods may support this.

EAP may be used on dedicated links, as well as switched circuits, and wired as well as wireless links. To date, EAP has been implemented with hosts and routers that connect via switched circuits or dial-up lines using PPP [RFC1661]. It has also been implemented with switches and access points using IEEE 802 [IEEE-802]. EAP encapsulation on IEEE 802 wired media is described in [IEEE-802.1X], and encapsulation on IEEE wireless LANs in [IEEE-802.11i].

One of the advantages of the EAP architecture is its flexibility. EAP is used to select a specific authentication mechanism, typically after the authenticator requests more information in order to determine the specific authentication method to be used. Rather than requiring the authenticator to be updated to support each new authentication method, EAP permits the use of a backend authentication server, which may implement some or all authentication methods, with the authenticator acting as a pass-through for some or all methods and peers.

Within this latter cited document, authenticator requirements apply regardless of whether the authenticator is operating as a pass-through or not Where the requirement is meant to apply to either the authenticator or backend authentication server, depending on where the EAP authentication is terminated, the term "EAP server" has been used.

EAP was designed for use in network access authentication, where IP layer connectivity may not be available. EAP is a lock-step protocol which only supports a single packet in flight. As a result, EAP cannot efficiently transport bulk data, unlike transport protocols such as TCP or SCTP.

While EAP provides support for retransmission, it assumes ordering guarantees provided by the lower layer, so out of order reception is not supported.

Since EAP does not support fragmentation and reassembly, EAP authentication methods generating payloads larger than the minimum EAP MTU need to provide fragmentation support.

While authentication methods such as EAP-TLS provide support for fragmentation and reassembly, the EAP methods defined in this latter cited document do not. As a result, if the EAP packet size exceeds the EAP MTU of the link, these methods will encounter difficulties.

EAP authentication is initiated by the server (authenticator), whereas many authentication protocols are initiated by the client (peer). As a result, it may be necessary for an authentication algorithm to add one or two additional messages (at most one roundtrip) in order to run over EAP.

Where certificate-based authentication is supported, the number of additional roundtrips may be much larger due to fragmentation of certificate chains. In general, a fragmented EAP packet will require as many round-trips to send as there are fragments. For example, a certificate chain 14960 octets in size would require ten round-trips to send with a 1496 octet EAP MTU. Where EAP runs over a lower layer in which significant packet loss is experienced, or where the connection between the authenticator and authentication server experiences significant packet loss, EAP methods requiring many round-trips can experience difficulties. In these situations, use of EAP methods with fewer roundtrips is advisable.

The EAP authentication exchange proceeds as follows:

[1] The authenticator sends a Request to authenticate the peer. The Request has a Type field to indicate what is being requested. Examples of Request Types include Identity, MD5-challenge, etc. The MD5-challenge Type corresponds closely to the CHAP authentication protocol [see: RFC1994]. Typically, the authenticator will send an initial Identity Request; however, an initial Identity Request is not required, and can be bypassed. For example, the identity may not be required where it is determined by the port to which the peer has connected (leased lines, dedicated switch or dial-up ports), or where the identity is obtained in another fashion (via calling station identity or MAC address, in the Name field of the MD5-Challenge Response, etc.).

[2] The peer sends a Response packet in reply to a valid Request. As with the Request packet, the Response packet contains a Type field, which corresponds to the Type field of the Request.

[3] The authenticator sends an additional Request packet, and the peer replies with a Response. The sequence of Requests and Responses continues as long as needed. EAP is a 'lock step' protocol, so that other than the initial Request, a new Request cannot be sent prior to receiving a valid Response. The authenticator is responsible for retransmitting requests. After a suitable number of retransmissions, the authenticator should end the EAP conversation. The authenticator needs to not send a Success or Failure packet when retransmitting or when it fails to get a response from the peer.

[4] The conversation continues until the authenticator cannot authenticate the peer (unacceptable Responses to one or more Requests), in which case the authenticator implementation needs to transmit an EAP Failure (Code 4). Alternatively, the authentication conversation can continue until the authenticator determines that successful authentication has occurred, in which case the authenticator needs to transmit an EAP Success (Code 3). Id.

Among other advantages, the EAP protocol can support multiple authentication mechanisms without having to pre-negotiate a particular one. In addition, Network Access Server (NAS) devices (such as, e.g., a switch or Access Point (AP)) do not have to understand each authentication method and may act as a pass-through agent for a backend authentication server. Support for pass-through is optional. An authenticator may authenticate local peers, while at the same time acting as a pass-through for non-local peers and authentication methods it does not implement locally. Additionally, separation of the authenticator from the backend authentication server simplifies credentials management and policy decision making.

Conceptually, EAP implementations consist of the following components:

[a] Lower layer. The lower layer is responsible for transmitting and receiving EAP frames between the peer and authenticator. EAP has been run over a variety of lower layers including PPP, wired IEEE 802 LANs [see: IEEE-802.1X], IEEE 802.11 wireless LANs [IEEE-802.11], UDP (L2TP [RFC2661] and IKEv2), and TCP.

[b] EAP layer. The EAP layer receives and transmits EAP packets via the lower layer, implements duplicate detection and retransmission, and delivers and receives EAP messages to and from the EAP peer and authenticator layers.

[c] EAP peer and authenticator layers. Based on the Code field, the EAP layer de-multiplexes incoming EAP packets to the EAP peer and authenticator layers. Typically, an EAP implementation on a given host will support either peer or authenticator functionality, but it is possible for a host to act as both an EAP peer and authenticator. In such an implementation both EAP peer and authenticator layers will be present.

[d] EAP method layers. EAP methods implement the authentication algorithms and receive and transmit EAP messages via the EAP peer and authenticator layers. Since fragmentation support is not provided by EAP itself, this is the responsibility of EAP methods. Id.

The later cited reference sets forth the following definitions, which are cited herein for reference.

Authenticator:

The end of the link initiating EAP authentication. The term authenticator is used in [IEEE-802.1X], and has a similar meaning in this document.

Peer:

The end of the link that responds to the authenticator. In [IEEE-802.1X], this end is known as the Supplicant.

Backend Authentication Server:

A backend authentication server is an entity that provides an authentication service to an authenticator. When used, this server typically executes EAP methods for the authenticator. This terminology is also used in [IEEE-802.1X].

AAA:

Authentication, Authorization, and Accounting (AAA) protocols with EAP support include RADIUS and Diameter. In this document, the terms "AAA server" and "backend authentication server" are used interchangeably.

EAP server or Server:

The entity that terminates the EAP authentication method with the peer. In the case where no backend authentication server is used, the EAP server is part of the authenticator. In the case where the authenticator operates in pass-through mode, the EAP server is located on the backend authentication server.

Successful Authentication:

In the context of this document, "successful authentication" is an exchange of EAP messages, as a result of which the authenticator decides to allow access by the peer, and the peer decides to use this access. The authenticator's decision typically involves both authentication and authorization aspects; the peer may successfully authenticate to the authenticator, but access may be denied by the authenticator due to policy reasons.

Master Session Key (MSK):

Keying material that is derived between the EAP peer and server and exported by the EAP method. The MSK is at least 64 octets in length. In existing implementations, an AAA server acting as an EAP server transports the MSK to the authenticator.

Extended Master Session Key (EMSK):

Additional keying material derived between the EAP client and server that is exported by the EAP method. The EMSK is at least 64 octets in length. The EMSK is not shared with the authenticator or any other third party. The EMSK is reserved for future uses that are not defined yet.

EAP Extension:

For reference, we refer to EAP Extensions for EAP Reauthentication Protocol (ERP), IETF Internet Draft, Aug. 24, 2007, of V. Narayanan, et al., seen at www.ietf.org/internet-drafts/draft-ietf-hokey-erx-04.txt. The reference explains EAP Extensions for EAP Reauthentication Protocol as follows. "The extensible authentication protocol (EAP) is a generic framework for transport of methods that authenticate two parties; the authentication is either one-way or mutual. The primary purpose is network access control, and a key generating method is recommended to enforce access control. The EAP keying hierarchy defines two keys that are derived at the top level—the master session key (MSK) and the extended MSK (EMSK). In the most common deployment scenario, a peer and a server authenticate each other through a third party known as the authenticator. The authenticator or an entity controlled by the authenticator enforces access control. After successful authentication, the server transports the MSK to the authenticator; the authenticator and the peer derive transient session keys (TSK) using the MSK as the authentication key or a key derivation key and use the TSK for per-packet access enforcement." Id. "When a peer moves from one authenticator to another, it is desirable to avoid full EAP authentication. The full EAP exchange with another run of the EAP method takes several round trips and significant time to complete, causing delays in handoff times. Some EAP methods specify the use of state from the initial authentication to optimize Re-authentications by reducing the computational overhead, but method-specific Re-authentication takes at least 2 roundtrips in most cases. It is also important to note that many methods do not offer support for Re-authentication. Thus, it is beneficial to have efficient Re-authentication support in EAP rather than in individual methods." Id.

"Key sharing across authenticators is sometimes used as a practical solution to lower handoff times. In that case, compromise of an authenticator results in compromise of EAP sessions established via other authenticators." Id. "In conclusion, there is a need to design an efficient EAP Re-authentication mechanism that allows a fresh key to be established between the peer and an authenticator without having to execute the EAP method again." Id. "This document specifies EAP Reauthentication Extensions (ERX) for efficient re-authentication using EAP. The EAP Reauthentication Protocol (ERP) based on ERX supports EAP method independent Re-authentication for a peer that has valid, unexpired key material from a previously performed EAP authentication. The protocol and the key hierarchy required for EAP Reauthentication is described in this document." Id.

Extension of EAP (EAP-EXT):

The present application provides further developments over, among other things, the inventions as set forth in the present assignees' prior U.S. non-provisional application Ser. No. 11/867,659, filed on Oct. 4, 2007, to Y. Oba, et al., and U.S. provisional application Ser. No. 60/869,113, filed on Dec. 8, 2006, to Y. Oba, et al., both entitled AN EAP METHOD FOR EAP EXTENSION (EAP-EXT), the entire disclosures of which are incorporated herein by reference as though recited herein in full. For background reference, information related to technology of said background application of the present assignees is incorporated in the following paragraphs.

1. Introduction to EAP-EXT

Further to the above discussion, EAP (Extensible Authentication Protocol) is an authentication protocol which supports multiple authentication algorithms known as "EAP methods" [RFC3748]. In EAP, an EAP peer and an EAP server generates EAP keying material, i.e., MSK (Master Session Key) and EMSK (Extended Master Session Key). A detailed framework for the generation, transport and usage of MSK is described in [I-D.ietf-eap-keying].

There is an extended functionality of EAP [RFC3748] by defining several usages of EMSK (Extended Master Session Key) where one of the EMSK usages is re-authentication. Another extended functionality of EAP is a channel binding scheme defined in [I-D.ohba-eap-channel-binding]. For further background reference regarding channel binding, the entire disclosure of co-pending application Ser. No. 11/379, 568, entitled CHANNEL BINDING MECHANISM BASED PARAMETER BINDING IN KEY DERIVATION, filed on Apr. 20, 2006, to Y. Ohba, is incorporated herein by reference in its entirety. Since implementations that support an extended functionality of EAP need to interoperate with implementations that do not support the extended functionality such that the former implementations can disable the extended functionality when communicating with the latter implementations, a mechanism is needed for an EAP peer and an EAP server to negotiate on the capabilities with regard to the extended functionality of EAP is needed.

There are two basic approaches for extending EAP functionality. One approach is to define new EAP Codes to realize the extended EAP functionality in addition to the existing ones, i.e., Request, Response, Success and Failure. This approach, however, requires changes to RFC3748 and may also require changes to lower layer protocols. The other approach is to define a new EAP method to realize the extended functionality. This document takes the latter approach to minimize the impact on the existing EAP deployment.

EAP-EXT is an EAP method for extending EAP functionality. In some preferred embodiments, the extended EAP functionality includes channel binding and re-authentication. The EAP-EXT method also allows sequencing of multiple EAP methods inside it.

2. EAP-EXT Overview

In the preferred embodiments, EAP-EXT provides capabilities exchange. In this regard, bits within the messages can be used for indication of capability. In some embodiments, one bit (R-bit) is used for indicating Re-authentication capability. In some embodiments, one bit (C-bit) is used for indicating channel binding capability.

When EAP-EXT is used, the precedent EAP-Identity exchange can be omitted if the identity of the peer is known to the server before the server sends the first EAP-Request. In this regard, there are several outband mechanisms for providing the identity of the peer to the server, e.g., transferring the identity of the peer between authenticators and servers.

In EAP-EXT, extended EAP capabilities such as, e.g., channel binding and re-authentication are exchanged between the peer and the server. At the same time, at least one EAP method (e.g., EAP-TLS) is run inside EAP-EXT for authenticating the peer. Until an inner method generates EAP keying material, no AUTH TLV (Type-Length-Value) is included and the capabilities are non-protected. Hence, if there is only one inner EAP method, additional EAP-EXT exchange(s) with an AUTH TLV but without a Method TLV is performed before sending an EAP-Success or an EAP-Failure message. For background reference regarding TLVs (Type-Length-Value), it is noted that in data communication protocols information may be encoded as a Type-Length-Value or TLV element inside of the protocol. By way of example, type and length fields are typically fixed in size (e.g., a few bytes) and the value field is typically variable size. These fields typically used as follows: type—a numeric code which indicates the kind of field that this part of the message represents; length—the size of the value field (typically in bytes); and value—variable sized set of bytes which contains data for this part of the message. Some of the advantages of using a TLV representation include: TLV sequences are easily searched using generalized parsing functions; new message elements which are received at an older node can be safely skipped and the rest of the message can be parsed; and TLV elements are typically used in a binary format which makes parsing faster and the data smaller.

After an inner EAP method generates EAP keying material, EAP-EXT messages need to be protected with an AUTH TLV. AUTH TLVs in EAP-EXT messages need to be computed using EAP-EXT-KEY generated from EAP keying material of the latest successful inner method. This means that if there are multiple inner EAP methods that are sequentially run inside EAP-EXT, a new EAP-EXT-KEY is generated each time an inner EAP method in the sequence generates EAP keying material. Any inner EAP method needs to be capable of generating EAP keying material.

At the end of a successful EAP-EXT run, the EAP keying material generated by the last successful inner EAP method is exported to the EAP layer. F-bit is used for indicating the end of EXP-EXT exchange.

FIG. 1 shows an example of EAP-EXT message sequence with a single inner EAP method. FIG. 2 shows an example of EAP-EXT message sequence with multiple inner EAP methods.

3. Error Handling

An error may happen for several reasons, e.g., due to failure of inner EAP method authentication or a malformed, unknown or missing EAP-EXT TLV. An error may be detected either by the peer or by the server. An EAP-EXT message that caused an error is referred to as an erroneous message. EAP-EXT messages with E-bit set are used for error indications. These messages are referred to as error indications. An error indication needs to contain an AUTH TLV, and should not contain other TLVs.

Any erroneous message (including an erroneous error indication) without a valid AUTH TLV needs to be silently discarded.

For an erroneous Request with a valid AUTH TLV, the peer sends an error indication Response. For an erroneous Response with a valid AUTH TLV, the server sends an error indication Request which is responded by the peer with an error indication Response. The server returns an EAP-Failure message in response to an error indication Response with a valid AUTH TLV.

4. Integrity Protection Keys

EAP-EXT defines two types of keys: 1) EAP-EXT-KEY and 2) EAP-REAUTH-KEY.

4.1. EAP-EXT-KEY

EAP-EXT-KEY is used for computing AUTH TLVs for integrity protecting EAP-EXT messages. When HMAC-SHA-256 (see, e.g., reference [sha256] incorporated by reference below) is used for the integrity algorithm, the length of EAP-EXT-KEY is 32-octet. An EAP-EXT-KEY is derived from the EMSK generated by an inner EAP method using the USRK (Usage Specific Root Key) derivation algorithm defined in (see, e.g., reference [I-D.salowey-eap-emsk-deriv] incorporated by reference below) as follows.

EAP-EXT-KEY=KDF (EMSK, "EAP-EXT-Integrity-Key", length).

In KDF, EAP-EXT-KEY uses the default PRF specified in reference [I-D.salowey-eap-emsk-deriv] incorporated by reference below.

For background reference, the USRK key derivation function (KDF) derives an USRK from the Extended Master Session Key (EMSK), an key label, optional data, and output length. The KDF is expected to give the same output for the same input. The basic key derivation function is: USRK=KDF(EMSK, key label, optional data, length). See Id. Typically, the key labels are printable ASCII strings unique for each usage definition and are a maximum of 255 bytes. See Id. In general, they are of the form label-string@domain where domain is the organization that controls the specification of the usage definition of the USRK. The key label provides global uniqueness. Rules for allocation of these labels are given in Section 7 of [I-D.salowey-eap-emsk-deriv].

As set forth in said document, the EMSK key derivation function is based on a pseudo random function (PRF) that has the following function prototype: KDF=PRF(key, data). See Id. The default PRF used for deriving USRKs from an EMSK is taken from the PRF+ key expansion PRF from [RFC4306] based on HMAC-SHA-256. The prf+ construction was chosen because of its simplicity and efficiency over other PRFs such as those used in [RFC2246]. The definition of PRF+ from [RFC4306] is given below:

$prf+(K,S)=T1|T2|T3|T4|\ldots$

Where:

$T1=prf(K, S|0x01)$ $T2=prf(K, T1|S|0x02)$ $T3=prf(K, T2|S|0x03)$ $T4=prf(K, T3|S|0x04)$ continuing as needed to compute the required length of key material.

The key, K, is the EMSK and S is the data defined in Section 3.1 of [I-D.salowey-eap-emsk-deriv]. See Id. As indicated, the PRF is taken as HMAC-SHA-256. See Id.

4.2. EAP-REAUTH-KEY

EAP-REAUTH-KEY is used as the pre-shared key required by an EAP method used for a re-authentication mechanism. The length of EAP-REAUTH-KEY depends on the re-authentication mechanism. The EAP-REAUTH-KEY is derived from the EMSK exported from EAP-EXT using the USRK derivation algorithm defined in reference [I-D.salowey-eap-emsk-deriv] incorporated below as follows.

EAP-REAUTH-KEY=KDF(EMSK, "EAP-EXT-Reauthentication-Key", length).

5. Message Format

EAP-EXT uses EAP Type X (To be assigned by IANA). The message format including the common EAP fields (e.g., Code, Identifier, Length and Type) defined in [RFC3748] is shown in FIG. 3(A).

F:

This bit needs to be set to indicate that this is the last EAP-EXT message from the sender. Otherwise, this bit needs to not be set.

This bit is set when the message is an error indication. When this bit is set, F-bit needs to also be set. See Section 3 for detailed description on error indications.

Version:

This 8-bit field indicates the version of the EAP-EXT method. This document defines Version 1.

Reserved:

This 6-bit field is reserved for future extensions. This field needs to be set to zero by the sender and the recipient needs to ignore this field.

Capabilities:

This field The Capabilities field contains extended EAP capabilities. The Capabilities field the format shown in FIG. 3(B).

Each bit corresponds to a particular capability. The semantics of each bit is as follows.

C:

This bit is set to indicate that the sender supports the channel binding mechanism defined in [I-D.ohba-eap-channel-binding] for MSK. When this bit is set for both Requests and Responses and the EAP-EXT method completes with success, the peer and the server needs to enable channel binding mechanism. The default hash algorithm for prf+ is AUTH_H-MAC_SHA1_160.

R:

This bit is set to indicate that the sender supports a re-authentication EAP method. When this bit is set in the final Request/EXT message (i.e., the Request/EXT with F-bit is set), the message needs to include a Server-ID TLV and a Peer-ID TLV and can include a Reauth-Key-Lifetime AVP. When this bit is set in the final Request/EXT and Response/EXT exchanges, the peer and the server needs to generate an EAP-REAUTH-KEY. The Server-ID and Peer-ID contained in the Server-ID and Peer-ID TLVs and the EAP-REAUTH-KEY is used for a re-authentication EAP method. A default re-authentication mechanism can be selected by those in the art based on this disclosure.

Other bits are reserved for future use, and needs to be set to zero by the sender and needs to be ignored by the recipient.

TLV (Type-Length-Value's):

Zero, one or more TLVs. The TLV format of is shown in FIG. 3(C).

Type:

This field indicates the type of this TLV.

Length:

This field indicates the length of this TLV in octets, including the Type and Length fields of the TLV.

Value:

This field contains data specific to the TLV Type.

6. EAP-EXT TLVs

The following TLVs are defined.

6.1. Method TLV

The Method TLV (Type 1) contains an EAP Method payload starting from Type field.

6.2. AUTH TLV

The AUTH TLV (Type 2) contains integrity data used for protecting EAP-EXT messages. The EAP-EXT-KEY is used for computing AUTH TLVs.

The TLV-Value field is computed over the entire EAP message including this field. Before computing the integrity data, this field needs to be initialized to all zeros. The length of this field depends on the integrity algorithm in use. When the integrity check fails, the message needs to be silently discarded. The default integrity algorithm is HMAC-SHA-256 (see, e.g., reference [sha256] incorporated below).

6.3. Peer-ID TLV

The Peer-ID TLV (Type 3) contains the identity of the peer used for re-authentication.

6.4. Server-ID TLV

The Server-ID TLV (Type 4) contains the identity of the server used for re-authentication.

6.5. Reauth-Key-Lifetime TLV

The Reauth-Key-Lifetime TLV (Type 5) contains the lifetime of EAP-REAUTH-KEY in seconds.

7. Security Considerations

Capability exchange before an inner EAP method exports EAP keying material is unprotected. Hence, additional protected message exchange after creation of EAP keying material is mandated to avoid the capabilities information to be altered by an attacker without being detected by the peer and the server.

EAP-EXT allows sequencing of multiple EAP methods inside it. It is known that a compound authentication method that consists of multiple nested or sequential authentication methods without cryptographically binding them has a vulnerability to man-in-the-middle attack. EAP-EXT is able to create the required cryptographically binding by protecting each inner EAP method together with the outer EAP method (i.e., EAP-EXT) with a key generated by its precedent successful inner method in the sequence and finally exporting EAP keying material generated by the last successful inner EAP method. In order to achieve cryptographic binding, EAP-EXT requires inner EAP methods to be capable of generating EAP keying material.

REFERENCES

The following background references are incorporated herein by reference in their entireties.

1. Bradner, S., "Key words for use in RFCs to Indicate Requirement Levels", BCP 14, RFC 2119, March 1997 (Referred to herein as [RFC2119]).
2. Aboba, B., Blunk, L., Vollbrecht, J., Carlson, J., and H. Levkowetz, "Extensible Authentication Protocol (EAP)," RFC 3748, June 2004 (Referred to herein as [RFC3748]).
3. Aboba, B., "Extensible Authentication Protocol (EAP) Key Management Framework", draft-ietf-eap-keying-16 (work in progress), January 2007 (Referred to herein as [I-D.ietf-eap-keying]); and [I-D.ietf-eap-keying] Aboba, B., "Extensible Authentication Protocol (EAP) Key Management Framework", draft-ietf-eap-keying-15 (work in progress), October 2006.
4. Narayanan, V. and L. Dondeti, "Problem Statement on EAP Efficient Re-authentication and Key Management", draft-vidya-eap-reauth-ps-00 (work in progress), October 2006 (Referred to herein as [I-D.vidya-eap-reauth-ps]).
5. Ohba, Y., "Channel Binding Mechanism based on Parameter Binding in Key Derivation", draft-ohba-eap-channel-binding-02 (work in progress), December 2006 (Referred to herein as [I-D.ohba-eap-channel-binding]).
6. Salowey, J., "Specification for the Derivation of Usage Specific Root Keys (USRK) from an Extended Master Session Key (EMSK)", draft-salowey-eap-emsk-deriv-01 (work in progress), June 2006 (Referred to herein as [I-D.salowey-eap-emsk-deriv]).
7. National Institute of Standards and Technology, "Secure Hash Standard", August 2002 (Referred to herein as [sha256]).
8. Arkko, J. and P. Eronen, "Authenticated Service Information for the Extensible Authentication Protocol (EAP)", http://tools.ietf.org/html/draft-arkko-eap-service-identity-auth-04, October 2005 (Referred to herein as [arkko-eap-service-identity-auth]).
9. Kaufman, C., "Internet Key Exchange (IKEv2) Protocol", RFC 4306, December 2005 (Referred to herein as [RFC4306]).
10. Narayanan, V. and L. Dondeti, "EAP Re-authentication Extensions", draft-ietf-hokey-erx-02 (work in progress), July 2007 (Referred to herein as [I-D.ietf-hokey-erx]).
11. Salowey, J., "Specification for the Derivation of Root Keys from an Extended Master Session Key (EMSK)", draft-ietf-hokey-emsk-hierarchy-01 (work in progress), June 2007 (Referred to herein as [I-D.ietf-hokey-emsk-hierarchy]).
12. Neuman, C., Yu, T., Hartman, S., and K. Raeburn, "The Kerberos Network Authentication Service (V5)", RFC 4120, July 2005 (Referred to herein as [RFC4120]).
13. Zhu, L. and B. Tung, "Public Key Cryptography for Initial Authentication in Kerberos (PKINIT)", RFC 4556, June 2006 (Referred to herein as [RFC4556]).

While a variety of systems and methods are known, there remains a need for improved systems and methods.

SUMMARY

The present invention improves upon existing systems and methods, including systems and methods described above.

According to some preferred embodiments, a system and method for Bootstrapping Kerberos from EAP is provided (referred to herein as BKE). Among other things, in order to support multiple network applications, the preferred embodiments advantageously make Kerberos available from EAP. Among other things, the preferred embodiments define, e.g., a new capability within the EAP-EXT method (see background discussion related to EAP-EXT)—including, a new capability bit for Kerberos.

According to some embodiments, a method for a mobile device to bootstrap Kerberos from EAP, wherein EAP is used for initial network access authentication of the mobile device and Kerberos is used for provisioning session keys to multiple different protocols to support multiple network applications, comprising: configuring the mobile node with an EAP peer that negotiates with an EAP server on capabilities regarding an EAP extended functionality pertaining to Kerberos, including employing an EAP extension method (EAP-EXT) that provides capabilities exchange between the EAP server and the EAP peer regarding Kerberos functionality, including: the EAP peer receiving a request message transmitted from the EAP server having a new capability bit (K) in a capabilities field related to Kerberos functionality; and having the EAP peer transmit a response message with a new capability bit (K) in a capabilities field related to the Kerberos functionality. In some examples, the method further includes upon both the EAP peer receiving a request message from the EAP server and the EAP peer transmitting a response message with a K-bit with an AUTH TLV set, having the EAP peer receive Kerberos bootstrapping parameters transmitted from the EAP server. In some examples, the method includes having the EAP peer receive Kerberos bootstrapping parameters transmitted from the EAP server employing a new Kerberos boot TLV (KRB-BOOT). In some examples, the method includes having the EAP peer then send a Kerberos AS-REQ message to the EAP server, wherein the AS-REQ message is contained in a Kerberos message TLV (KRB-MSG). In some examples, the method includes having the EAP server then forward the AS-REQ message to a Kerberos Key Distribution Center, and having the Key Distribution Center return an AS-REP to the EAP server, and having the EAP server forward the AS-REP to the EAP peer, where the AS-REP is contained in a KRB-MSG TLV. In some examples, the method includes generating a pre-shared key required by Kerberos (EAP-KRB-KEY) that is derived from an EMSK exported from the EAP extension method (EAP-EXT). In some examples, the method includes: generating a pre-shared key required by Kerberos (EAP-KRB-KEY) that is derived from an EMSK exported from an EAP-EXT using an USRK derivation algorithm where: EAP-KRB-KEY=KDF (EMS K, "EAP-EXT-Kerberos-Bootstrapping-Key", length).

According to some embodiments, a method for a mobile node performing a single sign-on in which an initial authentication for network access in a visited or a home domain is used to provision session keys to multiple different protocols used within the domain is provided that includes: configuring the mobile device to bootstrap Kerberos from EAP in which EAP is used for initial network access authentication and Kerberos is used for provisioning session keys to multiple different protocols; and including provisioning session keys to link-layer protocols so as to optimize link-layer handover performance by eliminating EAP signaling for handovers within the domain. In some examples, the method includes employing an EAP extension method (EAP-EXT) that provides capabilities exchange between the EAP server and the EAP peer regarding Kerberos functionality, including: having the EAP peer receive a request message transmitted from the EAP server having a new capability bit (K) in a capabilities field related to the Kerberos functionality, and having the EAP peer transmit a response message with a new capability bit (K) in a capabilities field related to the Kerberos functionality.

According to some embodiments, a system for a mobile device to perform a single sign-on in which an initial authentication for network access in a domain is used to provision session keys to multiple different protocols used within the domain includes: a) a mobile device and a server configured to together bootstrap Kerberos from EAP, wherein EAP is used for initial network access authentication of the mobile device and Kerberos is used for provisioning session keys to multiple different protocols to support multiple network applications; b) the mobile device and the server being configured to together negotiate on capabilities regarding an EAP extended functionality pertaining to Kerberos, including employing an EAP extension method (EAP-EXT) that provides capabilities exchange between an EAP server and an EAP peer regarding Kerberos functionality, including: i) the server having an EAP server configured to transmit to the EAP peer a request message having a new capability bit (K) in a capabilities field related to the Kerberos functionality; and ii) the mobile device having an EAP peer configured to transmit a response message with a new capability bit (K) in a capabilities field related to the Kerberos functionality.

The above and/or other inventions, aspects, features and/or advantages of various embodiments will be further appreciated in view of the following description in conjuncton with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 3(A) is a diagram depicting illustrative message formats according to some exemplary embodiments related to EAP-EXP;

FIG. 3(B) is a diagram depicting an illustrative capabilities field according to some exemplary embodiments related to EAP-EXP;

FIG. 3(C) is a diagram depicting an illustrative TLV format according to some exemplary embodiments related to EAP-EXP;

FIGS. 5 and 6 show message sequences according to some illustrative embodiments employing BKE functionality of the present invention, wherein FIG. 5 shows message sequences between a client/peer, a server and a KDC, and FIG. 6 shows message sequences between a client/peer, a server, an authenticator and a KDC;

PREFERRED EMBODIMENTS OF THE INVENTION

Figure 1:
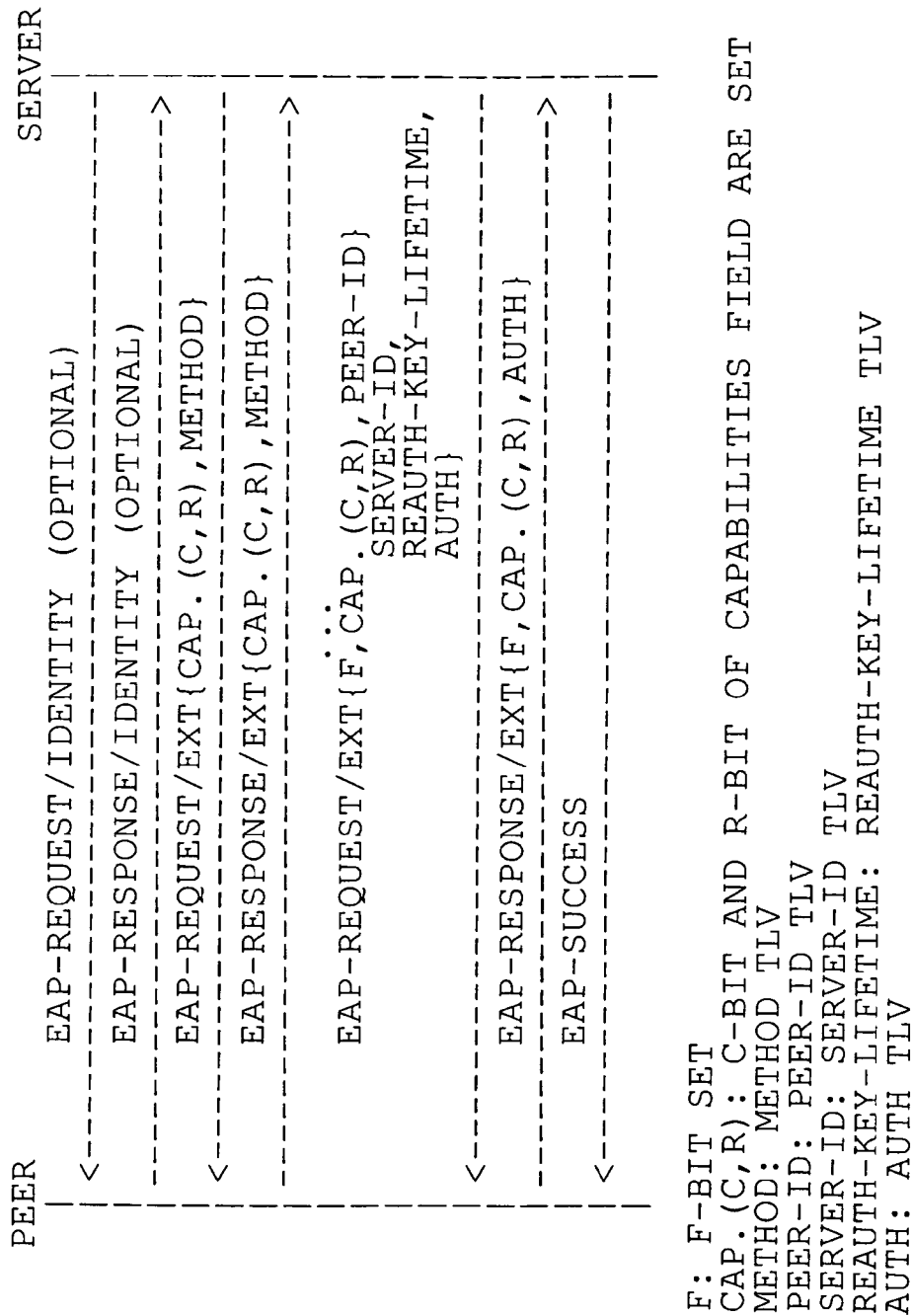
FIG. 1 is a diagram depicting an illustrative EAP-EXT message sequence between an EAP Server and an EAP Peer with a single inner method according to some embodiments.
Figure 2:
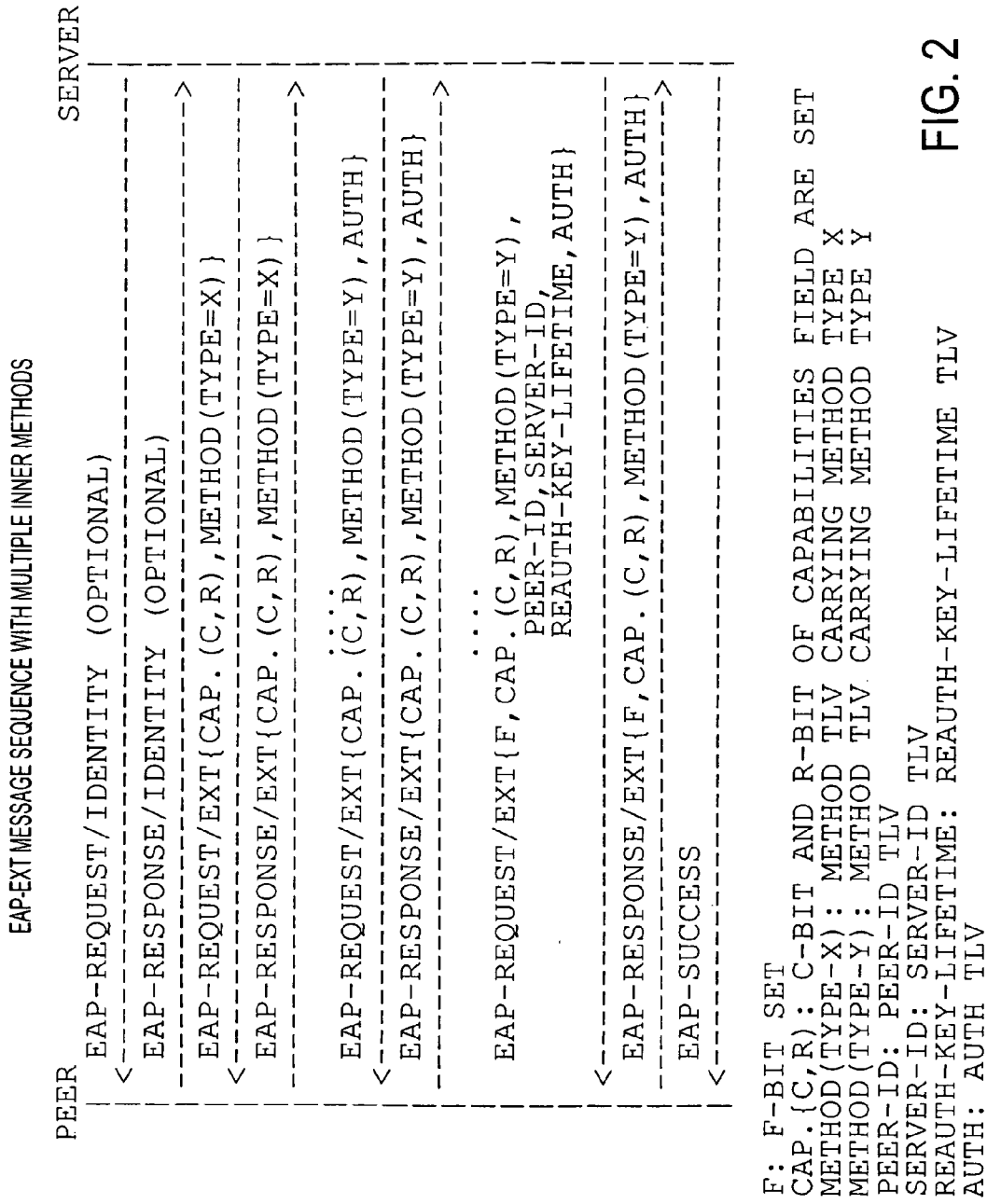
FIG. 2 is a diagram depicting an illustrative EAP-EXT message sequence between an EAP Server and an EAP Peer with multiple inner methods according to some embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

According to some preferred embodiments, a system and method for Bootstrapping Kerberos from EAP is provided (referred to herein as BKE). Among other things, in order to support multiple network applications, the preferred embodiments advantageously make Kerberos available from EAP.

Among other things, the preferred embodiments define, e.g., a new capability within the EAP-EXT method (see background discussion related to EAP-EXT)—including, a new capability bit for Kerberos.

1. Introduction

Kerberos [RFC4120] is a third-party authentication protocol that provides a means of verifying the identities of endpoints of various network applications on an open (unprotected) network by using shared secret key cryptography. Extensions to Kerberos can provide for the use of public key cryptography during certain phases of the authentication protocol [RFC4556].

EAP (Extensible Authentication Protocol) is an authentication protocol which supports multiple authentication algorithms known as "EAP methods" [RFC3748]. The applicability of EAP is, however, for network access authentication. EAP is not designed for providing authentication for various network applications.

For reference, Table 1, below, is a chart that highlights some of the differences between Kerberos and EAP.

TABLE 1

| (Comparison of Kerberos vs. EAP) | | |
|---|---|---|
| | Kerberos | EAP |
| Authentication methods | Only a few authentication methods are currently supported | Support a number of authentication methods |
| Applicability | Applicable to any network application | Applicable to network access authentication |

There is an emerging need for single sign-on in which an initial authentication for network access in a visited or a home domain can provision session keys to multiple different protocols used within the domain, ranging from link-layer to application-layer protocols.

Especially, provisioning session keys to link-layer protocols can optimize link-layer handover performance by eliminating EAP signaling for every handover within the domain, including intra-authenticator and inter-authenticator handovers.

This document describes a mechanism to bootstrap Kerberos from EAP in which EAP is used for initial network access authentication and Kerberos is used for provisioning session keys to multiple different protocols. This document makes use of EAP-EXT methodology to realize the mechanism.

2. Overview of the Preferred Embodiments

According to the preferred embodiments, a new capability is defined within the EAP-EXT methodology (described above), involving a new capability bit for Kerberos.

The preferred embodiments define a new capability bit (K) in a Capabilities field and also new TLVs (e.g., KRB-BOOT TLV and KRB-MSG TLV) of EAP-EXT. In the preferred embodiments, this new capability bit (K) and these new TLVs are employed in the following manner.

In the EAP-EXT exchange, the peer and server set the K-bit in Capabilities field if they want to use functionality of the present invention (such functionality referred to herein as BKE). If both the peer and the server set the K-bit with an AUTH TLV set, then, in the preferred embodiments, the system employs additional EAP-EXT exchanges in the following way.

The server first sends Kerberos bootstrapping parameters to the peer. Preferably, the Kerberos bootstrapping parameters are contained in a Kerberos-Boot (KRB-BOOT) TLV. The peer then sends a Kerberos AS-REQ message to the server, where the AS-REQ message is contained in a Kerberos-Message (KRB-MSG) TLV. The server then forwards the AS-REQ message to the Kerberos KDC (Key Distribution Center). Then, the KDC returns an AS-REP to the server, where this part of signaling is performed outside EAP-EXT. The server forwards the AS-REP to the peer, where the AS-REP is contained in a KRB-MSG TLV.

Finally, the peer sends a confirmation to the server and the server sends an EAP-Success or a EAP-Failure message to the peer. In the preferred embodiments, all of these exchanges need to be protected with an AUTH TLV.

The manner in which Kerberos is used after it is bootstrapped from EAP can be determined by those in the art based on circumstances, and details related thereto are not required for purposes of the present invention.

FIG. 1 shows an example of EAP-EXT message sequence with BKE.

3. New Message Format

Figure 4:
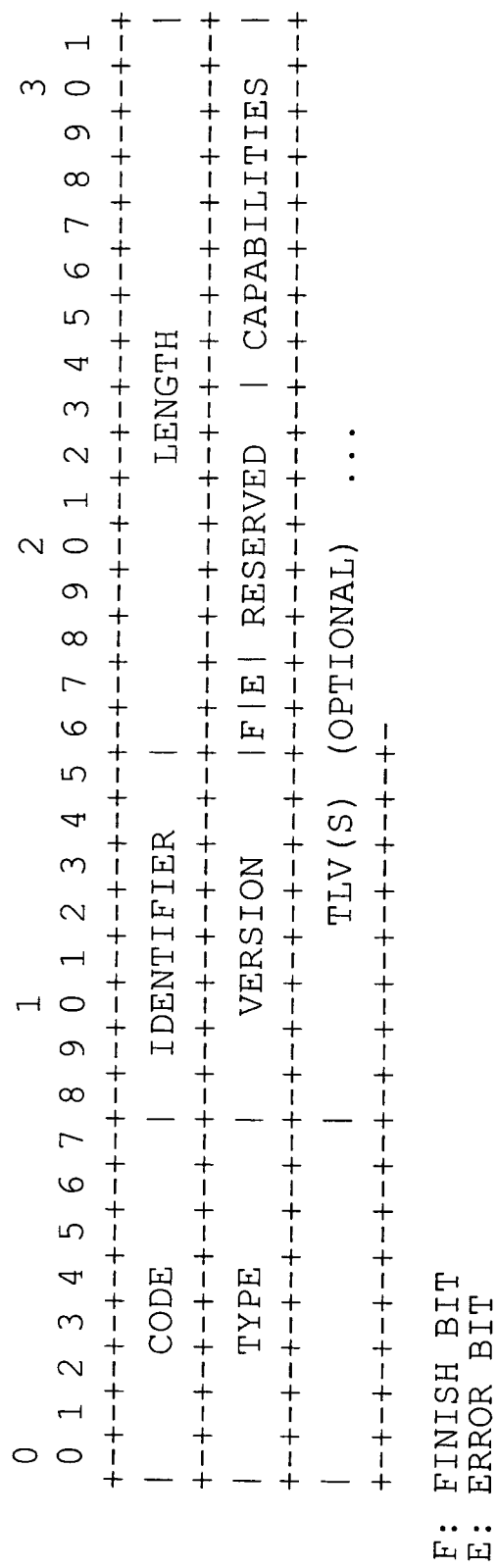
FIG. 4 is a diagram depicting illustrative message formats according to some exemplary embodiments of the present invention.

According to the preferred embodiments, as indicated above, a new bit in Capabilities flag of EAP-EXT is defined—i.e., a new K bit With reference to FIG. 4, changes to the EAP-EXT message format according to the preferred embodiments herein are depicted.

This K bit indicates support for bootstrapping Kerberos from EAP (referred to herein as BKE). In the preferred embodiments, once both the peer and the server set the K-bit with an AUTH TLV set, then additional exchanges are performed within EAP-EXT in the manner as described above.

4. New Keys

In the preferred embodiments, one new key is defined in order to provide functionality of the present invention. This new key is referred to as EAP-KRB-KEY. EAP-KRB-KEY is used as the pre-shared key required by Kerberos. In the preferred embodiments, the length and lifetime of ERP-KRB-KEY is communicated from the server to the peer within EAP-EXT—e.g., the length of ERP-KRB-KEY is negotiated within EAP-EXT. In the preferred embodiments, the EAP-KRB-KEY key is derived from the EMSK exported from EAP-EXT using the USRK derivation algorithm defined in, e.g., reference [I-D.salowey-eap-emsk-deriv] incorporated by reference above as follows.

EAP-KRB-KEY=KDF (EMSK, "EAP-EXT-Kerberos-Bootstrapping-Key", length)

In KDF, EAP-EXT-KRB uses the default PRF specified in [I-D.salowey-eap-emsk-deriv].

5. New EAP-EXT TLVs

According to the preferred embodiments, the following new TLVs are defined.

5.1. Kerberos-Boot (KRB-BOOT) TLV

According to the preferred embodiments, a new Kerberos-Boot TLV (Type 6) is established that contains Kerberos bootstrapping parameters. In the preferred embodiments, the following Kerberos bootstrapping parameters are contained in the order of appearance:

a) EAP-KRB-KEY Length (2 Octets)

In the preferred embodiments, this field indicates the length of EAP-KRB-KEY in octets.

b) EAP-KRB-KEY Lifetime (2 Octets)

In the preferred embodiments, this field indicates the lifetime of EAP-KRB-KEY in seconds. The lifetime needs to exceed the lifetime of EMSK.

c) Principal Name (Variable Length)

In the preferred embodiments, this field contains a Kerberos principal name of the peer, encoded by DER (Distinguished Encoding Rules) of ASN.1 (Abstract Syntax Notation One). The Distinguished Encoding Rules of ASN.1 is an International Standard drawn from the constraints placed on basic encoding rules (BER) encodings by X.509. Abstract Syntax Notation One (ASN.1) defines the following rule sets that govern how data structures that are being sent between computers are encoded and decoded: Basic Encoding Rules (BER); Canonical Encoding Rules (CER); Distinguished Encoding Rules (DER); and Packed Encoding Rules (PER). The original rule set was defined by the BER specification. CER and DER were developed later as specialized subsets of BER. PER was developed in response to criticisms about the amount of bandwidth required to transmit data using BER or its variants. PER provides a significant savings. DER was created to satisfy the requirements of the X.509 specification for secure data transfer. For example, the Certificate Enrollment API uses DER exclusively. For reference, see International Telecommunication Union, Information Technology—ASN.1 Encoding Rules—Specification of Basic Encoding Rules (BER), Canonical Encoding Rules (CER), and Distinguished Encoding Rules (DER), ITU-T Recommendation X.690, July 2002, the entire disclosure of which is incorporated herein by reference.

d) Realm (Variable Length)

In the preferred embodiments, this field contains a Kerberos realm of the peer and the KDC, encoded by DER (Distinguished Encoding Rules) of ASN.1 (Abstract Syntax Notation One).

e) IP Address Length (1 Octet)

In the preferred embodiments, this field contains the length of KDC's IP address.

f) IP Address of KDC (4 or 16 Octets)

In the preferred embodiments, this field contains a binary-encoded IP address of KDC. If the IP address length is 4, it preferably contains an IPv4 address. If the IP address length is 16, it preferably contains an IPv6 address.

5.2. Kerberos-Message (KRB-MSG) TLV

In the preferred embodiments, the Kerberos-Message TLV (Type 7) contains a Kerberos message (e.g., DER-encoded messages), such as AS-REQ and AS-REP messages.

6.0 Illustrative Message Exchange Sequences

FIGS. 5 to 9 show some illustrative message exchange sequences, depicting illustrative communications between components or modules.

Figure 5:
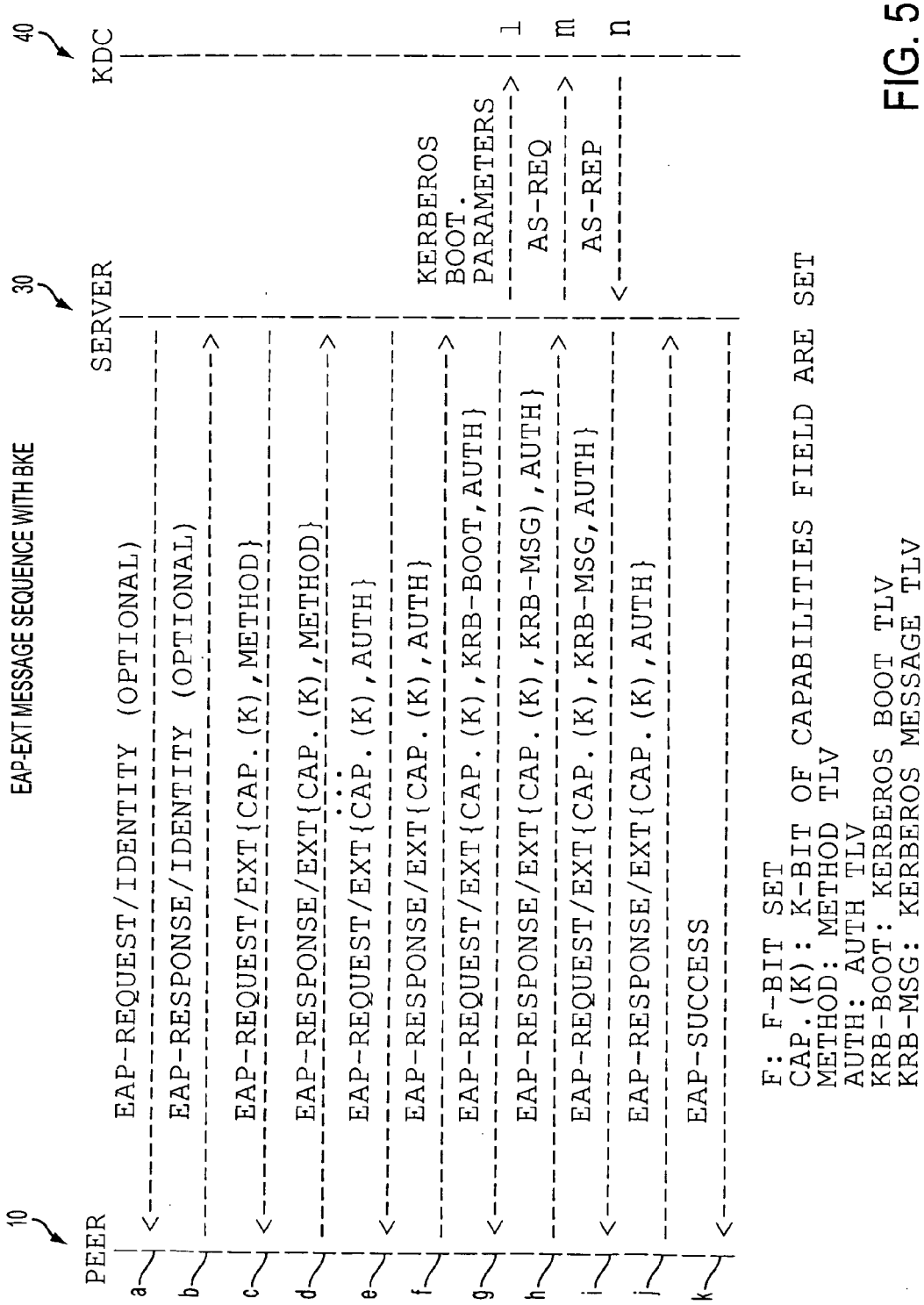
Figure 6:
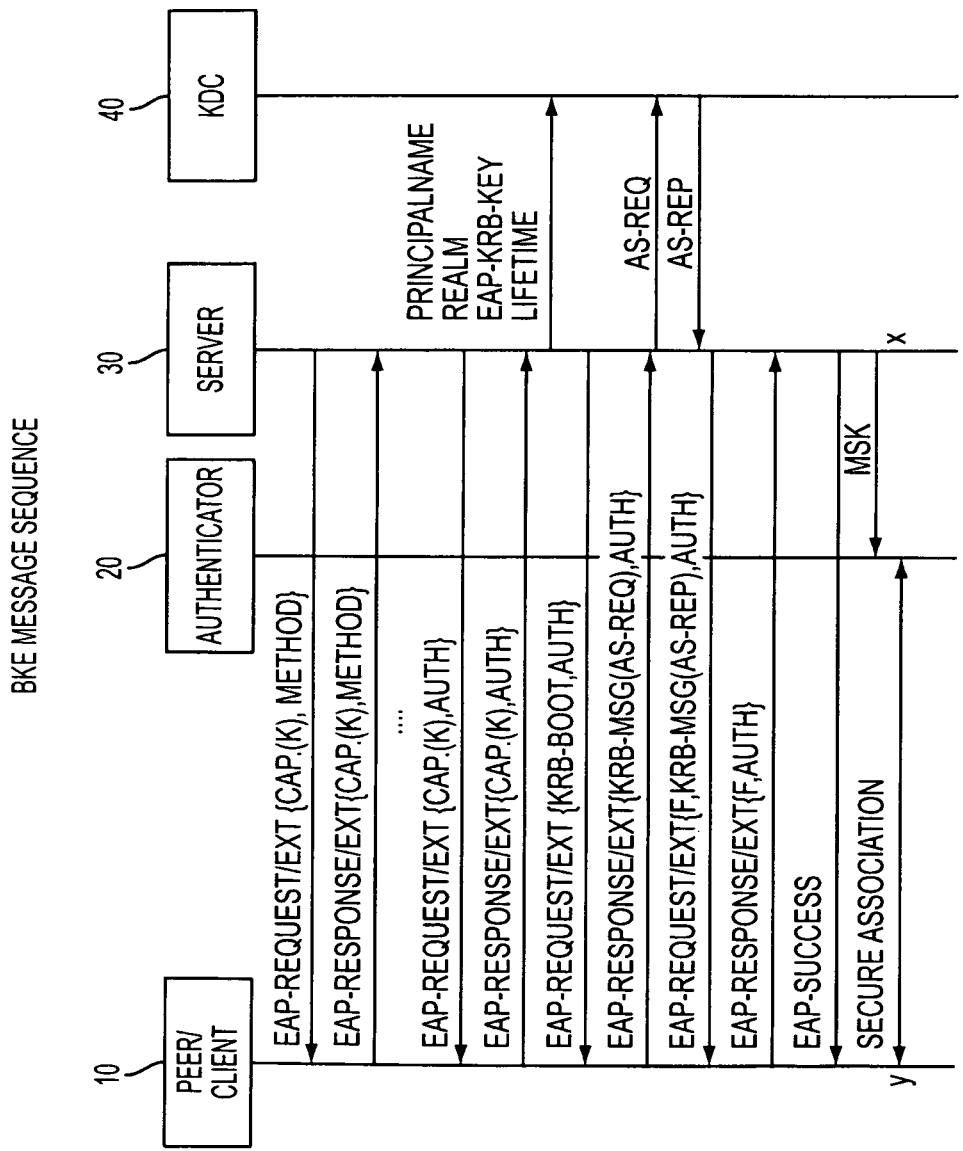
Figure 7:
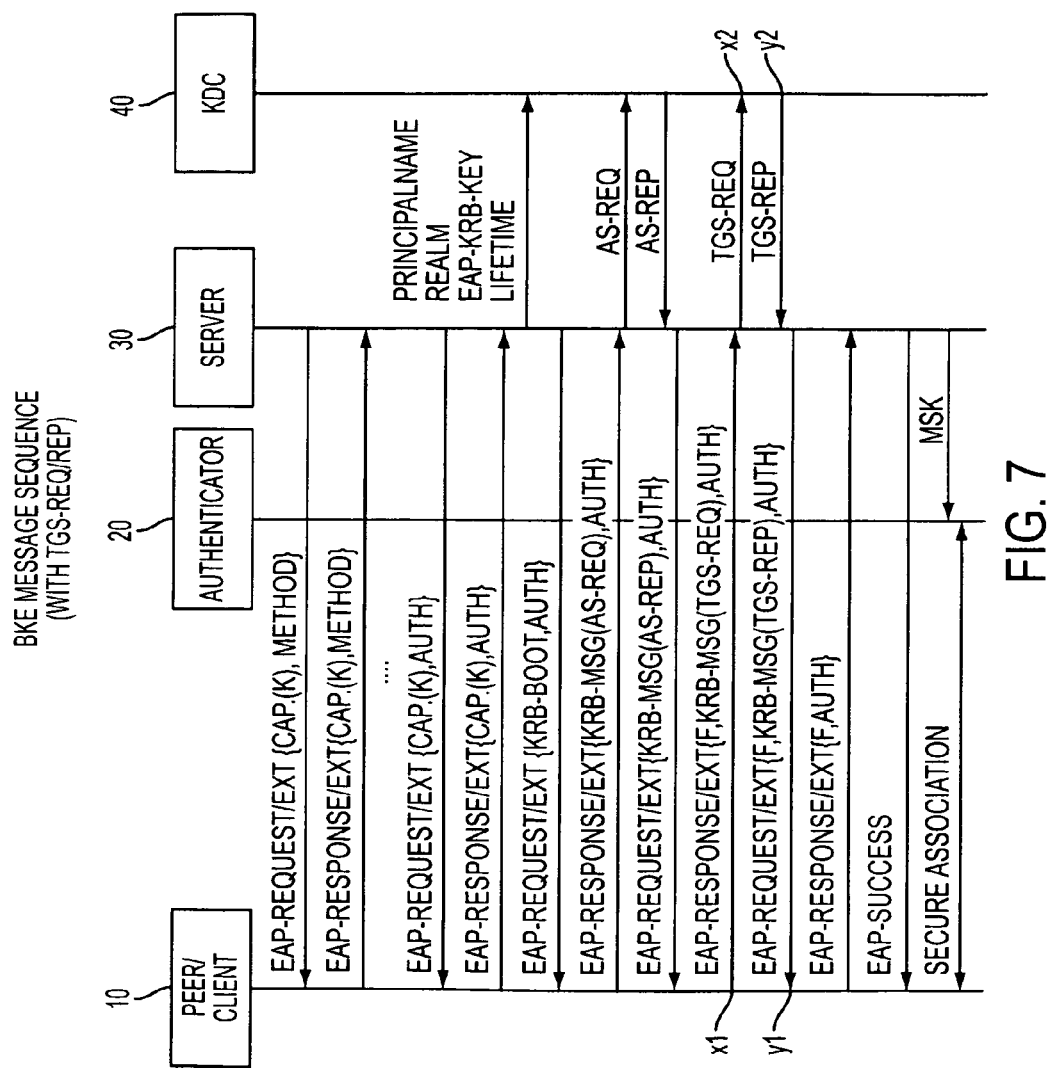
FIG. 7 is another message sequence according to some illustrative embodiments employing BKE functionality, further including TGS-REQ/REP.

In this regard, FIGS. 5 to 7 show message sequences according to some illustrative embodiments employing BKE functionality of the preferred embodiments of the present invention. Here, FIG. 5 shows message sequences between a client/peer 10, a server 30 and a Key Distribution Center (KDC) 40, and FIGS. 6 and 7 show message sequences between a client/peer 10, a server 30, an authenticator 20 and a KDC (40).

In this regard, the client/peer 10 can, in the preferred embodiments, be contained in a mobile node or device, such as, e.g., a cellular telephone, a personal computer, a laptop computer, a wearable computer, a PDA, etc. In this regard, the client/peer 10 can include functionality of an EAP peer (represented in green in FIGS. 6 and 7) and a Kerberos client (represented in red in FIGS. 6 and 7).

As shown in FIG. 5, communication as between a client/peer 10, a server 30 and a key distribution center (KDC) 40 can be as follows in some embodiments employing BKE.

First, as shown at a) in FIG. 5, the server 30 can optionally transmit an EAP-Request/Identity to the peer 10, and the peer 10 can, as shown at b) in FIG. 5, optionally transmit an EAP-Response/Identity to the server 30.

Next, as shown at c) in FIG. 5, the server 30 transmits an EAP-Request/EXT{Cap.(K), Method} message to the peer 10. Here, Cap. (K) shows that the message has a K-bit of the Capabilities field set, and Method relates to Method TLV. In reply, as shown at d) in FIG. 5, the peer 10 can transmit an EAP-Response/EXT{Cap.(K), Method} message to the server 30.

Next, as shown at e) in FIG. 5, the server 30 transmits an EAP-Request/EXT{Cap.(K), AUTH} message to the peer 10. Here, Cap. (K) shows that the message has a K-bit of the Capabilities field set, and AUTH relates to AUTH TLV. In reply, as shown at f) in FIG. 5, the peer 10 can transmit an EAP-Response/EXT{Cap.(K), AUTH} message to the server 30.

Next, as shown at g) in FIG. 5, the server 30 transmits an EAP-Request/EXT{Cap.(K), KRB-BOOT, AUTH} message to the peer 10. Here, Cap. (K) shows that the message has a K-bit of the Capabilities field set, KRB-BOOT relates to the Kerberos Boot TLV (which includes Kerberos bootstrapping parameters), and AUTH relates to AUTH TLV. In reply, as shown at h) in FIG. 5, the peer 10 can transmit an EAP-Response/EXT{Cap.(K), KRB-MSG, AUTH} message to the server 30. Here, a AS-REQ message is contained in the Kerberos-Message TLV (KRB-MSG).

As shown at l) in FIG. 5, the server 30 also transmits the Kerberos bootstrapping parameters to the KDC.

In addition, as shown at m) in FIG. 5, the server 30 then forwards the AS-REQ message to the Kerberos KDC (Key Distribution Center). Then, as shown at n) in FIG. 5, the KDC returns an AS-REP message to the server, where this part of signaling is performed outside EAP-EXT.

Next, as shown at i) in FIG. 5, the server 30 forwards the AS-REP to the peer 10, where the AS-REP is contained in a KRB-MSG TLV. In that regard, the server 30 transmits at i) an EAP-Request/EXT{Cap.(K), KRB-MSG, AUTH} message as shown.

Finally, the peer sends a confirmation to the server and the server sends an EAP-Success or a EAP-Failure message to the peer. Here, preferably, as shown at j) in FIG. 5, the peer 10 sends an EAP-Response/EXT {Cap.(K), AUTH} message to the server 30, and the server 30 sends an EAP-Success message to the peer 10.

In the preferred embodiments, all of these exchanges need to be protected with an AUTH TLV.

With reference to FIG. 6, this figure is substantially similar to the message sequence shown in FIG. 5. However, FIG. 6 further depicts message exchange in relation to the authenticator 20. In this regard, after step j) shown in FIG. 5, as shown at x) in FIG. 6, the server transmits the MSK to the authenticator 20, and then at y), a Secure Association is established between the peer/client and the authenticator.

FIG. 7 is another message sequence according to some illustrative embodiments employing BKE functionality, further including TGS-REQ/REP. For background reference, in Kerberos, a client asks a Ticket Granting Server (TGS) for a ticket needed for communicating with an application server. The ticket generated by the TGS includes the identity of the client and a session key, all encrypted in the application server's key. The TGS returns the ticket and a copy of the session key to the client, all encrypted in the client's key. However, this exchange does not by itself provide any assurance of the identity of the client. Assurance of the identity of the client is made by another exchange between the client and application server based on verifying the ticket. The TGS agrees on the client's identity by issuing the ticket. The client and application server agree on the client's identity by verifying the ticket issued by the TGS. The three-party agreement on the client identity is made securely based on cryptographic proof of possession of the session key between the client and application server, where the ticket has the binding between the session key and client's identity.

With reference to FIG. 7, as shown at x1), the peer 10 transmits a message to the server 30 of a format EAP-Response/EXT {F, KRB-MSG (TGS-REQ), AUTH}, and as shown at x2), the server 30 transmits a TGS-REQ to the KDC. Then, the KDC returns a TGS-REP as shown at y2) in FIG. 7. Next, the server 30 transmits a message to the peer 10 of a format EAP-Request/EXT {F, KRB-MSG (TGS-REP), AUTH}. Then, the peer transmits the EAP-Response/EXT {F, AUTH} similar to that described above.

Figure 8:
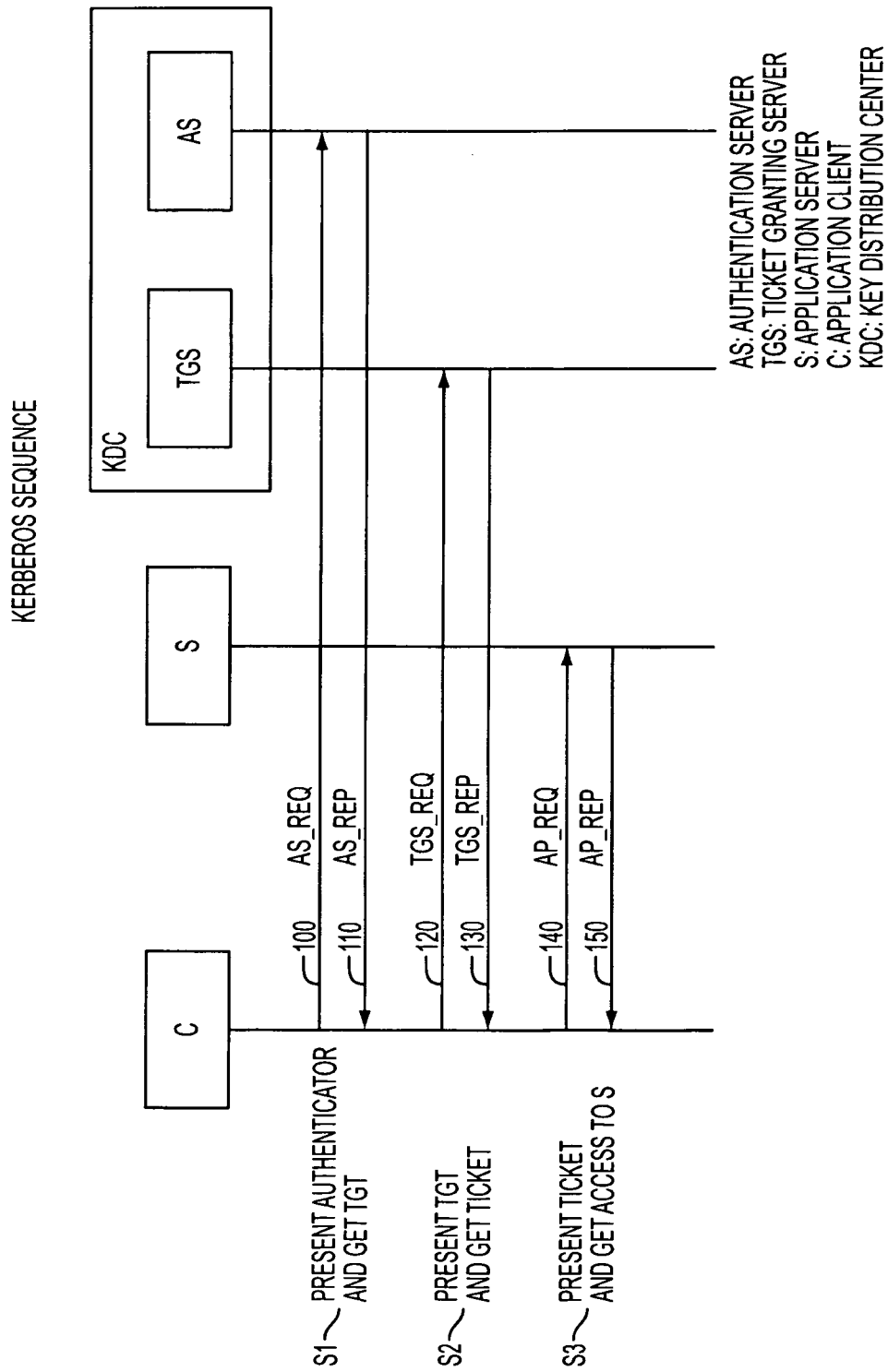
FIG. 8 is a diagram depicting Kerberos message sequencing for reference.
Figure 9:
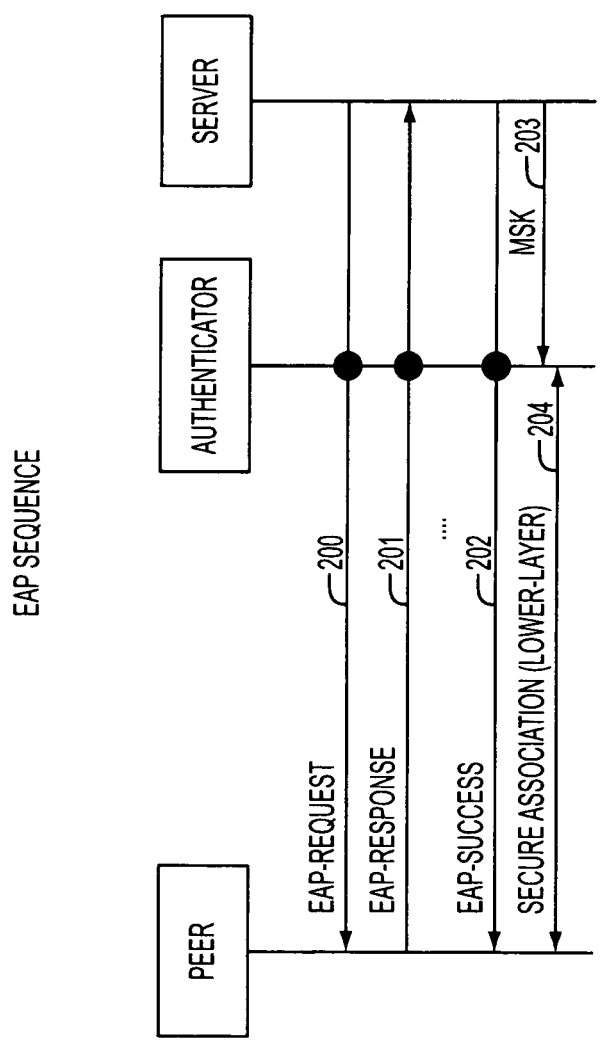
FIG. 9 is a diagram depicting EAP message sequencing for reference.

For reference, FIG. 8 is provided which depicts an illustrative Kerberos message sequence involving an Application Client (C), an Application Server (S), and a Key Distribution Center (KDC), wherein the KDC includes a Ticket Granting Server (TGS) and an Authentication Server (AS). In this illustrative example, three message exchange steps are shown: a) step S1 of the sequence involves presenting authenticator and getting TGT (in this regard, as shown at 100, an AS_REQ message is transmitted to the Authentication Server (AS) and, as shown at 110, an AS_REP message is transmitted from the Authentication Server); b) step S2 of the sequence involves presenting TGT and getting a ticket (in this regard, as shown at 120, a TGS_REQ message is transmitted to the Ticket Granting Server (TGS) and, as shown at 130, a TGS_REP message is transmitted from the TGS Server);

For reference, FIG. 9 depicts an illustrative EAP message sequence involving a peer, an authenticator and a server. In the figure, message 200 depicts an EAP-Request from the server, message 201 depicts an EAP-Response from the peer, message 202 depicts an EAP-Success message from the server, message 203 depicts an MSK message from the server, and 204 depicts a Secure Association (lower-layer) established. Here, the Authenticator provides network access service to Peer. In some embodiments, the Authenticator and Server may be implemented on the same device, while in some embodiments, the Authenticator and Server can be implemented on separated devices. When implemented on separated devices, the Authenticator acts as a "pass-through" forwarder of EAP messages between the Peer and the Server.

Figure 10:
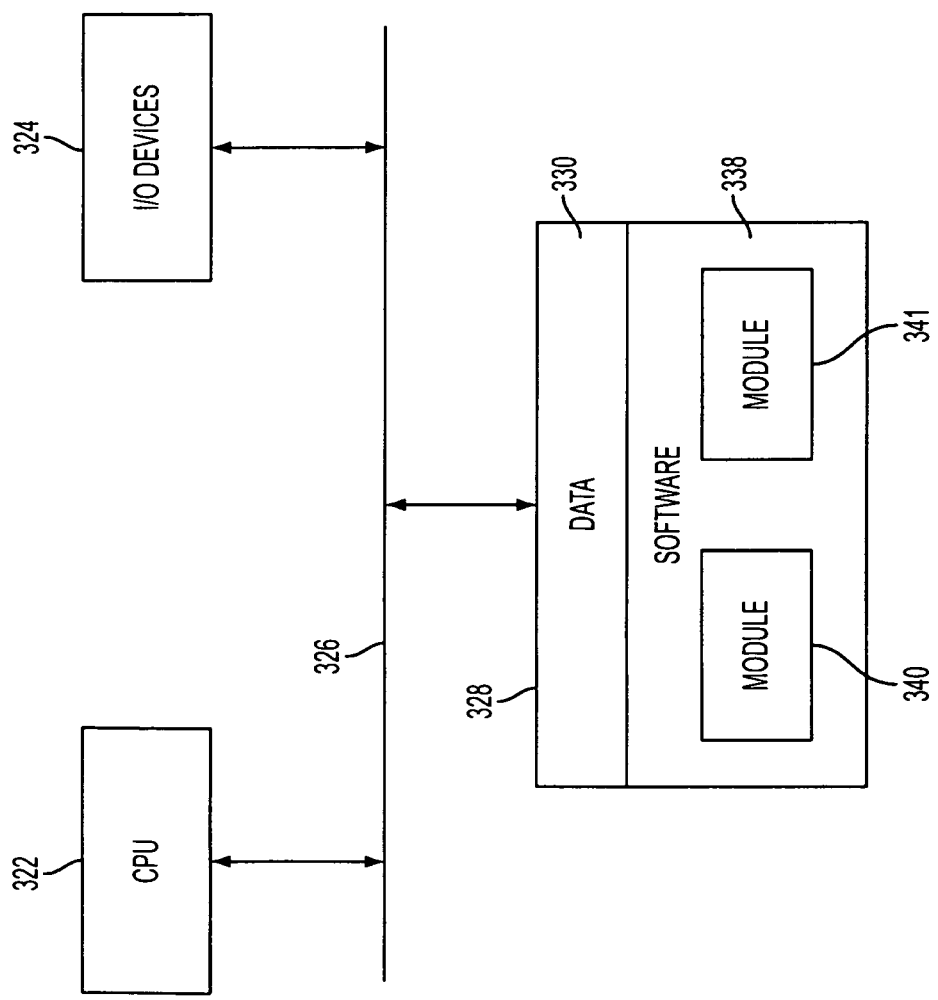
FIG. 10 is a diagram depicting some illustrative architectural components that may be employed within devices according to some embodiments.

Illustrative Computer Architectures:

FIG. 10 shows illustrative computer or the like structure that can be used to implement process steps and communications, to be carried out by devices or entities, such as, e.g., peers, clients, servers, authenticators, mobile devices, access points, etc., in some illustrative embodiments. In some embodiments, such devices or entities include a central processing unit (CPU) 322, which can communicate with a set of input/output (I/O) device(s) 324 over a bus 326. The I/O devices 324 can include, for example, keypad(s), display(s), and/or other devices. The devices can also include transmitters, receivers and/or transceivers (e.g., employing antennas or the like) for communications, which communications can include wireless communications, wired communications, etc., as appropriate for achieving appropriate device functionality as would be appreciated by those in the art based this disclosure. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via computer program products for use with computer systems. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

What is claimed is:

1. A method, comprising: causing a mobile device to bootstrap Kerberos from EAP including:
    employing EAP for initial network access authentication of the mobile device and Kerberos for provisioning session keys to multiple different protocols to support multiple network applications, including:
    a) configuring the mobile node with an EAP peer that negotiates with an EAP server on capabilities regarding an EAP extended functionality pertaining to Kerberos, including employing an EAP extension method (EAP-EXT) that provides capabilities exchange between the EAP server and the EAP peer regarding Kerberos functionality, including:
        i) the EAP peer receiving a request message transmitted from the EAP server having a new capability bit (K) in a capabilities field related to Kerberos functionality; and
        ii) having the EAP peer transmit a response message with a new capability bit (K) in a capabilities field related to the Kerberos functionality,
    wherein an initial authentication for network access in a visited domain is employed to provision session keys to multiple different protocols used within the domain, including link-layer and application-layer protocols, whereby link-layer handover performance is optimized by eliminating EAP signaling for handover within the domain, including intra-authenticator and inter-authenticator handovers.

2. The method of claim 1, further including upon both the EAP peer receiving a request message from the EAP server and the EAP peer transmitting a response message with a K-bit with an AUTH TLV set, having the EAP peer receive Kerberos bootstrapping parameters transmitted from the EAP server.

3. The method of claim 2, further including having the EAP peer receive Kerberos bootstrapping parameters transmitted from the EAP server employing a new Kerberos boot TLV (KRB-BOOT).

4. The method of claim 3, further including having the EAP peer then send a Kerberos AS-REQ message to the EAP server, wherein the AS-REQ message is contained in a Kerberos message TLV (KRB-MSG).

5. The method of claim 4, further including having the EAP server then forward the AS-REQ message to a Kerberos Key Distribution Center, and having the Key Distribution Center return an AS-REP to the EAP server, and having the EAP server forward the AS-REP to the EAP peer, where the AS-REP is contained in a KRB-MSG TLV.

6. The method of claim 5, further including generating a pre-shared key required by Kerberos (EAP-KRB-KEY) that is derived from an EMSK exported from the EAP extension method (EAP-EXT).

7. The method of claim 6, further including generating a pre-shared key required by Kerberos (EAP-KRB-KEY) that is derived from an EMSK exported from an EAP-EXT using an USRK derivation algorithm where: EAP-KRB-KEY=KDF (EMSK, "EAP-EXT-Kerberos-Bootstrapping-Key", length).

8. A method, comprising:
    causing a mobile node to perform a single sign-on in which an initial authentication for network access in a visited or a home domain is used to provision session keys to multiple different protocols used within the domain, including:
    a) configuring the mobile device to bootstrap Kerberos from EAP in which EAP is used for initial network access authentication and Kerberos is used for provisioning session keys to multiple different protocols; and
    b) including provisioning session keys to link-layer protocols so as to optimize link-layer handover performance by eliminating EAP signaling for handovers within the domain,
    wherein an initial authentication for network access in a visited domain is employed to provision session keys to multiple different protocols used within the domain, including link-layer and application-layer protocols, whereby link-layer handover performance is optimized by eliminating EAP signaling for handover within the domain, including intra-authenticator and inter-authenticator handovers.

9. The method of claim 8, further including employing an EAP extension method (EAP-EXT) that provides capabilities exchange between the EAP server and the EAP peer regarding Kerberos functionality, including:
    having the EAP peer receive a request message transmitted from the EAP server having a new capability bit (K) in a capabilities field related to the Kerberos functionality, and
    having the EAP peer transmit a response message with a new capability bit (K) in a capabilities field related to the Kerberos functionality.

10. A system, comprising:
    a mobile device configured to perform a single sign-on in which an initial authentication for network access in a domain is used to provision session keys to multiple different protocols used within the domain, including:
a) said mobile device and a server being configured to together bootstrap Kerberos from EAP, wherein EAP is used for initial network access authentication of the mobile device and Kerberos is used for provisioning session keys to multiple different protocols to support multiple network applications;
b) the mobile device and the server being configured to together negotiate on capabilities regarding an EAP extended functionality pertaining to Kerberos, including employing an EAP extension method (EAP-EXT) that provides capabilities exchange between an EAP server and an EAP peer regarding Kerberos functionality, including:
  i) the server having an EAP server configured to transmit to the EAP peer a request message having a new capability bit (K) in a capabilities field related to the Kerberos functionality; and
  ii) the mobile device having an EAP peer configured to transmit a response message with a new capability bit (K) in a capabilities field related to the Kerberos functionality,
wherein an initial authentication for network access in a visited domain is employed to provision session keys to multiple different protocols used within the domain, including link-layer and application-layer protocols, whereby link-layer handover performance is optimized by eliminating EAP signaling for handover within the domain, including intra-authenticator and inter-authenticator handovers.

11. The system of claim 10, wherein the EAP server is configured such that upon both the EAP server transmitting a request message to the EAP peer and the EAP server receiving a response message from the EAP peer with a K-bit with an AUTH TLV set, the EAP server transmits Kerberos bootstrapping parameters to the EAP peer.

12. The system of claim 11, wherein the EAP server is configured to transmit to the EAP peer Kerberos bootstrapping parameters employing a new Kerberos boot TLV (KRB-BOOT).

13. The system of claim 12, wherein the EAP peer is configured to then send a Kerberos AS-REQ message to the EAP server, wherein the AS-REQ message is contained in a Kerberos message TLV (KRB-MSG).

14. The system of claim 13, wherein the EAP server is configured to forward the AS-REQ message to a Kerberos Key Distribution Center.

15. The system of claim 14, further including a Key Distribution Center that is configured to return an AS-REP to the EAP server.

16. The system of claim 15, further including the EAP server being configured to forward the AS-REP to the EAP peer, where the AS-REP is contained in a KRB-MSG TLV.

17. The system of claim 10, wherein the system is configured to generate a pre-shared key required by Kerberos (EAP-KRB-KEY).

18. The system of claim 17, wherein the pre-shared key required by Kerberos (EAP-KRB-KEY) is derived from an EMSK exported from an EAP extension method (EAP-EXT) using an USRK derivation algorithm where:

EAP-KRB-KEY=KDF(EMSK, "EAP-EXT-Kerberos-Bootstrapping-Key", length).

* * * * *

UNITED STATES PATENT AND TRADEMARK OFFICE
CERTIFICATE OF CORRECTION

| | |
|---|---|
| PATENT NO. | : 8,707,416 B2 |
| APPLICATION NO. | : 11/944605 |
| DATED | : April 22, 2014 |
| INVENTOR(S) | : Oba et al. |

It is certified that error appears in the above-identified patent and that said Letters Patent is hereby corrected as shown below:

On the Title Page, Item (56), under "OTHER PUBLICATIONS", in Column 2, Line 1, delete ""Boostrapping" and insert -- "Bootstrapping --, therefor.

On the Title Page, Item (56), under "OTHER PUBLICATIONS", in Column 2, Line 2, delete "boostrap-kerberos-00"," and insert -- bootstrap-kerberos-00", --, therefor.

On the Title Page, Item (56), under "OTHER PUBLICATIONS", in Column 2, Lines 8-11, delete "Mohamedali Kaafar et al. "A Kerberos-Based Authentication Architecture for Wireless LANs", Mobile and Wireless Communications Lecture Notes in Computer Science, Jan. 1, 2004, pp. 1344-1353, vol. 3042, Greece.".

On the Title Page, Item (56), under "OTHER PUBLICATIONS", in Column 2, Lines 12-15, delete "Ohba Toshiba S Das Telcordia Y: "An EAP Method for EAP Extension (EAP-EXT); draft-ohba-hokey-emu-eap-e xt-00.txt" IETF Standard-Working-Draft, Internet Engineering Task Force, IETF, CH, Jan. 4, 2007, XP015050280 ISSN: 0000-0004.".

On Title Page 2, Item (56), under "OTHER PUBLICATIONS", in Column 2, Line 2, delete "(IAKERB))"," and insert -- (IAKERB)", --, therefor.

In the Specification

In Column 1, Line 32, delete "identfier." and insert -- identifier. --, therefor.

In Column 10, Line 31, delete "an key" and insert -- a key --, therefor.

In Column 14, Line 29, delete "(EMS K," and insert -- (EMSK, --, therefor.

In Column 15, Line 8, delete "conjuncton" and insert -- conjunction --, therefor.

Signed and Sealed this
Fourth Day of November, 2014

Michelle K. Lee
*Deputy Director of the United States Patent and Trademark Office*

CERTIFICATE OF CORRECTION (continued)
U.S. Pat. No. 8,707,416 B2

In Column 17, Line 21, delete "or a" and insert -- or an --, therefor.

In Column 17, Line 35, delete "bit" and insert -- bit. --, therefor.

In Column 19, Line 58, delete "or a" and insert -- or an --, therefor.